(12) United States Patent
Harding

(10) Patent No.: US 7,576,347 B2
(45) Date of Patent: Aug. 18, 2009

(54) METHOD AND APPARATUS FOR OPTICALLY INSPECTING AN OBJECT USING A LIGHT SOURCE

(75) Inventor: Kevin George Harding, Nishkayuna, NY (US)

(73) Assignee: General Electric Company, Schenectady, NY (US)

( * ) Notice: Subject to any disclaimer, the term of this patent is extended or adjusted under 35 U.S.C. 154(b) by 31 days.

(21) Appl. No.: 11/259,344

(22) Filed: Oct. 24, 2005

(65) Prior Publication Data

US 2007/0090308 A1 Apr. 26, 2007

(51) Int. Cl.
*G01B 11/24* (2006.01)
*G01B 11/16* (2006.01)

(52) U.S. Cl. .................. 250/559.45; 356/35.5

(58) Field of Classification Search .......... 356/601, 356/521, 511, 489, 35.5; 250/559.4–559.49
See application file for complete search history.

(56) References Cited

U.S. PATENT DOCUMENTS

| | | | |
|---|---|---|---|
| 4,349,277 A | 9/1982 | Mundy et al. | |
| 4,585,947 A | 4/1986 | Liptay-Wagner et al. | |
| 4,686,374 A | 8/1987 | Liptay-Wagner et al. | |
| 4,933,541 A | 6/1990 | Dufour | |
| 5,202,749 A | 4/1993 | Pfister | |
| 5,307,151 A | 4/1994 | Hof et al. | |
| 5,539,514 A * | 7/1996 | Shishido | 356/237.4 |
| 6,028,671 A | 2/2000 | Svetkoff et al. | |
| 6,031,611 A * | 2/2000 | Rosakis et al. | 356/511 |
| 6,064,759 A | 5/2000 | Buckley et al. | |
| 6,084,712 A | 7/2000 | Harding | |
| 6,469,788 B2 * | 10/2002 | Boyd et al. | 356/369 |
| 6,600,565 B1 * | 7/2003 | Suresh | 356/521 |
| 6,639,685 B1 | 10/2003 | Gu et al. | |
| 6,678,057 B2 | 1/2004 | Harding et al. | |
| 7,283,250 B2 | 10/2007 | Schmit et al. | |
| 2002/0014577 A1 | 2/2002 | Ulrich et al. | |
| 2005/0111726 A1 | 5/2005 | Hackney et al. | |

FOREIGN PATENT DOCUMENTS

WO WO 90/07691 7/1990

OTHER PUBLICATIONS

Hu, Qingying, et al., Shiny Parts Measurement Using Color Separation, 8 page abstract, GE GRC, Schenectady, NY (Oct. 22, 2005).
EP Search Report, App. No. 06255429 (Feb. 22, 2007).

* cited by examiner

*Primary Examiner*—Georgia Y Epps
*Assistant Examiner*—Tony Ko
(74) *Attorney, Agent, or Firm*—William Scott Andes, Esq.; Armstrong Teasdale LLP

(57) ABSTRACT

A method for inspecting an object includes emitting light from a light source, projecting the light emitted from the light source onto a surface of the object, splitting light reflected from the object surface into a first image and a second image, receiving the first image and the second image with an imaging sensor, and analyzing the first and second images received by the imaging sensor to facilitate inspecting at least a portion of the object.

17 Claims, 4 Drawing Sheets

METHOD AND APPARATUS FOR OPTICALLY INSPECTING AN OBJECT USING A LIGHT SOURCE

BACKGROUND OF THE INVENTION

This application relates generally to inspecting objects, and more specifically to methods and apparatus for inspecting objects using a light measurement system.

Objects are sometimes inspected, for example, to determine a size and/or shape of all or a portion of the object and/or to detect defects in the object. For example, some gas turbine engine components, such as turbine or compressor blades, are inspected to detect fatigue cracks that may be caused by vibratory, mechanical, and/or thermal stresses induced to the engine. Moreover, and for example, some gas turbine engine blades are inspected for deformations such as platform orientation, contour cross-section, bow and twist along a stacking axis, thickness, and/or chord length at given cross-sections. Over time, continued operation of the object with one or more defects may reduce performance of the object and/or lead to object failures, for example, as cracks propagate through the object. Accordingly, detecting defects of the object as early as possible may facilitate increasing the performance of the object and/or reducing object failures.

To facilitate inspecting objects, at least some objects are inspected using a light measurement system that projects a structured light pattern onto a surface of the object. The light measurement system images the structured light pattern reflected from the surface of the object and then analyzes the deformation of the reflected light pattern to calculate the surface features of the object. However, different areas of the object may have different manufacturing tolerances. Accordingly, some areas of the object may require a greater resolution of light projected onto the object than others to obtain enough data to inspect their tolerances. Some known light measurement systems inspect the object at the greatest resolution desired to inspect the object, or in other words, the resolution desired to inspect an area of the object that has the tightest tolerances. However, for areas with looser tolerances, excess data may be obtained from the greater resolution. Such excess date may be filtered or processed down to the resolution desired for the area with looser tolerances, thereby possibly increasing a time and effort of inspecting the object. Other known light measurement systems may inspect object areas of different tolerances with different inspection tools that have different resolutions. However, inspecting different areas of the object with different inspection tools may increase a time of setting up the system and/or object for inspection. Moreover, to merge inspection data for the entire portion of the object inspected, data from multiple sensors may be registered together, which may be time consuming and/or difficult.

BRIEF DESCRIPTION OF THE INVENTION

In one aspect, a method is provided for inspecting an object includes emitting light from a light source, projecting the light emitted from the light source onto a surface of the object, splitting light reflected from the object surface into a first image and a second image, receiving the first image and the second image with an imaging sensor, and analyzing the first and second images received by the imaging sensor to facilitate inspecting at least a portion of the object.

In another aspect, a structured light measurement system for inspecting an object includes a structured light source configured to project structured light onto a surface of the object, an imaging sensor configured to receive structured light reflected from the object surface, and a light-splitting device positioned to split light reflected from the object into a first image and a second image.

DETAILED DESCRIPTION OF THE INVENTION

Figure 1:
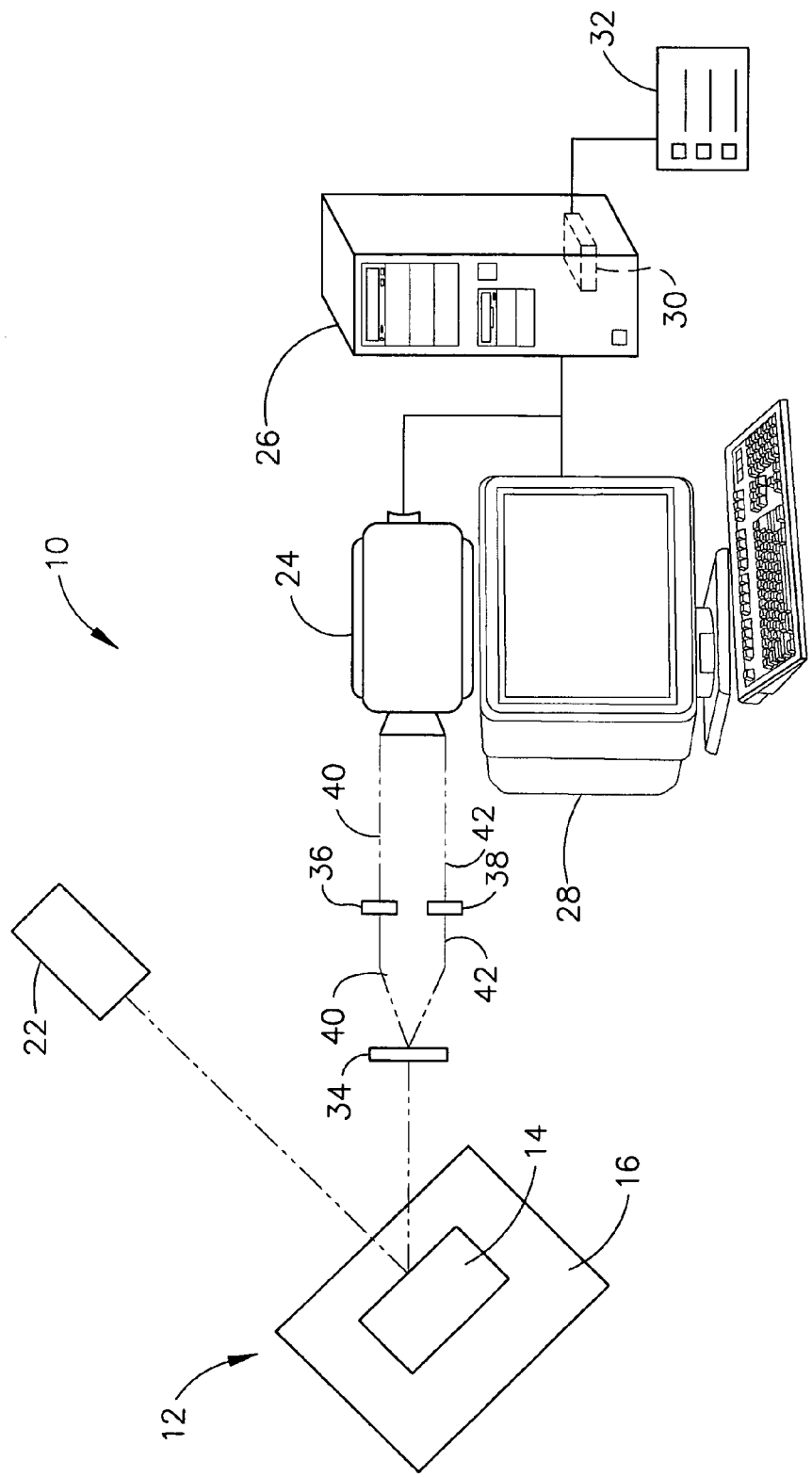
FIG. 1 is a block diagram of an exemplary embodiment of a structured light measurement system.

FIG. 1 is a block diagram of an exemplary embodiment of a structured light measurement system 10 that is used to measure a plurality of surface features of an object 12. For example, system 10 may be used to inspect and determine surfaces of object 12, wherein the surfaces may include features such as tilts, bends, twists, and/or warps when compared to a model representative of object 12.

In the exemplary embodiment, object 12 is a rotor blade, such as, but not limited to, a compressor or turbine blade utilized in a turbine engine. Accordingly, and in the exemplary embodiment, object 12 includes an airfoil 14 extending outwardly from a platform 16. While the following description is directed to inspecting gas turbine engine blades, one skilled in the art will appreciate that system 10 may be utilized to improve structured light imaging for any object.

System 10 includes a structured light source 22, such as, but not limited to, a liquid crystal display (LCD) projector, a liquid crystal on silicon (LCOS) projector, a digital micromirror device (DMD) projector, a laser, a white light lamp, and/or a light emitting diode (LED). System 10 also includes an imaging sensor 24 that receives structured light reflected from object 12. In the exemplary embodiment, imaging sensor 24 is a camera that receives and creates images using structured light reflected from object 12, although system 10 may utilize other imaging sensors 24. One or more computers 26 process images received from sensors 24, and a monitor 28 may be utilized to display information to an operator. In one embodiment, computer(s) 26 include a device 30, for example, a floppy disk drive, CD-ROM drive, DVD drive, magnetic optical disk (MOD) device, and/or any other digital device including a network connecting device such as an Ethernet device for reading instructions and/or data from a computer-readable medium 32, such as a floppy disk, a CD-ROM, a DVD, and/or another digital source such as a network or the Internet, as well as yet to be developed digital means. In another embodiment, computer(s) 26 execute instructions stored in firmware (not shown). Computer(s) 26 are programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

System 10 also includes a light-splitting device 34, a patterning device 36, and a patterning device 38. Although other light-splitting devices 34 may be used, in some embodiments light-splitting device 34 includes a prism, a lens, a holographic element, and/or a beamsplitter. Light-splitting device 34 is positioned to receive light reflected from object 12 and, in the exemplary embodiment, split the received light into light 40 of a first image and light 42 of a second image. Light 40 of the first image is directed from light-splitting device 34 to patterning device 36, and light 42 of the second image is directed from device 34 to patterning device 38. Although light-splitting device 34 is illustrated and described herein as splitting light reflected from object 12 into first and second images, in some embodiments light-splitting device 34 splits light reflected from object 12 into more than two images.

Patterning device 36 is positioned to disperse light 40 into a predetermined pattern (not shown). The predetermined pattern facilitates providing a predetermined resolution of the first image, as viewed by imaging sensor 24. Although two patterning devices 36 and 38 are illustrated and described herein, system 10 may include any number of patterning devices for dispersing light of any number of images into any number of predetermined patterns. Although other patterns may be used, in some embodiments patterning device 36 disperses light 40 of the first image into a diffraction pattern and/or an interference pattern. Although other patterning devices 36 may be used, in some embodiments patterning device 36 includes a diffraction grating, a phase grating, an LCD device, a DMD device, a light valve, a reference pattern, and/or an LCOS device.

For example, in some embodiments patterning device 36 is a diffraction grating that disperses light 40 into a diffraction pattern. In some embodiments, the diffraction grating includes a pattern of periodic lines and spaces, such as, for example, a ronchi ruling. However, the diffraction grating need not include a pattern of lines and spaces, much less periodic lines and spaces. Rather, the diffraction grating may include any pattern on and/or embedded within the substrate. For example, in some embodiments the pattern includes a pattern of lines and spaces, wherein the spacing between lines changes by a predetermined amount to, for example, increase in pitch from one side of an image of light dispersed from patterning device 36 to the other side to compensate for magnification changes across the image field. The pattern may be formed on the substrate using any suitable method and/or structure. For example, in some embodiments the pattern is formed from a plurality of strands of material, such as, but not limited to metal strands (e.g., chrome strands), attached to and/or embedded within the substrate. In other embodiments, the pattern is etched into the substrate, and the etched portions may be filled with a suitable material, such as, but not limited to, metal (e.g., chrome). Although the substrate may be fabricated from other materials, in some embodiments the substrate of grating 36 is fabricated from glass and/or quartz.

In some embodiments, and for example, patterning device 36 includes a reference pattern having a shape corresponding to a shape of a reference model representative of object 12. More specifically, in such embodiments patterning device 36 disperses light into a pattern of a series of lines and spaces as they would appear as projected onto the reference model. As such, the reference pattern can be compared to the pattern projected onto object 12 to highlight a difference in shape between the object 12 and the reference model.

In some embodiments, and for example, patterning device 36 includes a pattern (not shown) that disperses light channeled therethrough into an interference pattern, such as, but not limited to, a phase grating. Although other phase gratings may be used, in some embodiments the phase grating includes a bleached photographic plate having a grating pattern thereon and/or a holographic recording on a bleached photographic plate.

Figure 2:
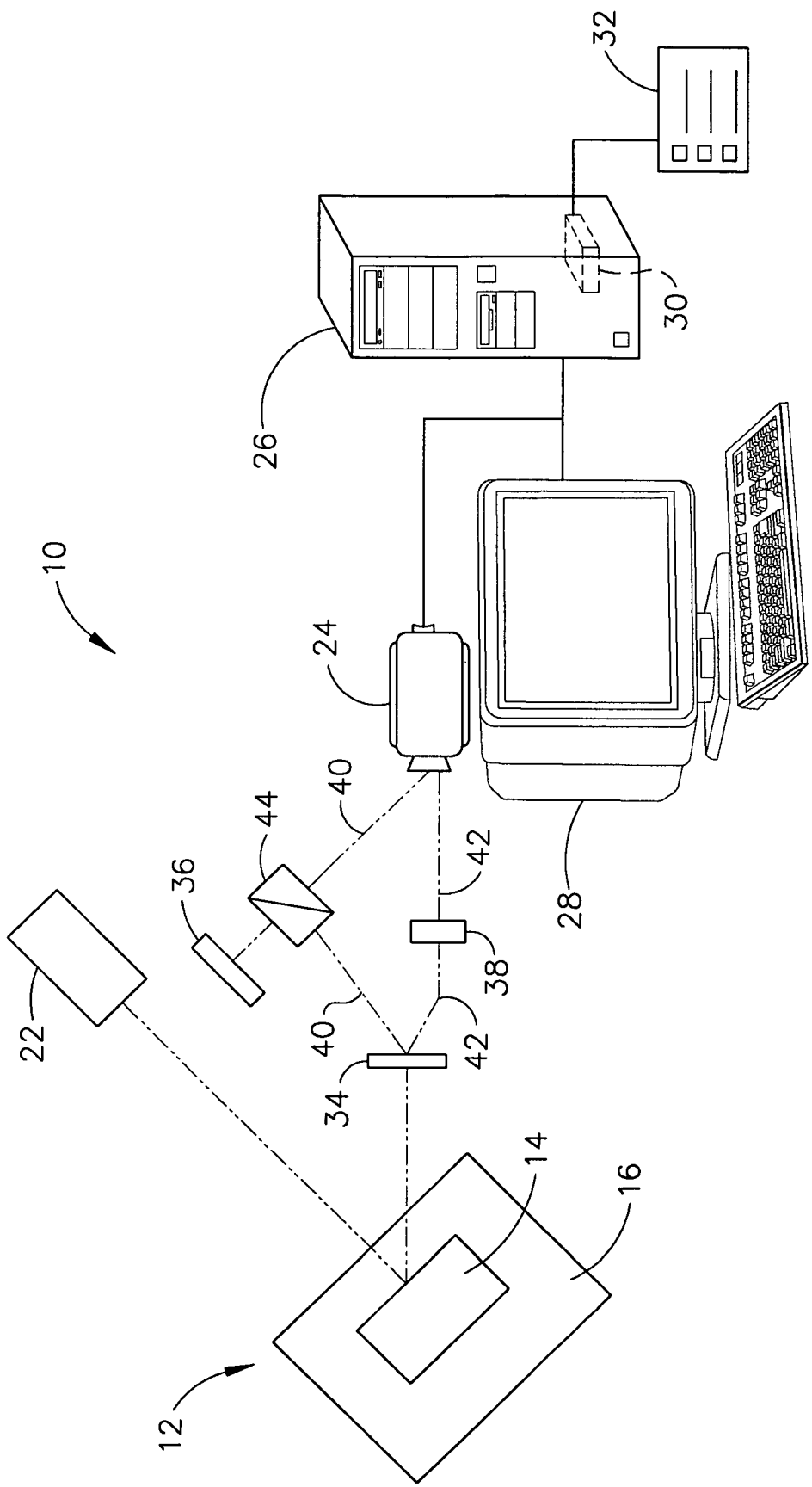
FIG. 2 is a block diagram of another embodiment of the structured light measurement system shown in FIG. 1.

FIG. 2 is a block diagram of an exemplary embodiment of system 10 wherein patterning device 36 includes a DMD. Light 40 of the first image split by light-splitting device 34 is reflected off a mirror 44 and directed to the DMD of patterning device 36. Although other mirrors 44 may be used, in some embodiments mirror 44 is a half-silver mirror. Light 40 reflected off the DMD of patterning device 36 is dispersed by the DMD in the predetermined pattern and is channeled through mirror 44 for reception by imaging sensor 24. Of course, the embodiment of system 10 shown in FIG. 2 and described herein is exemplary only. Other configurations and/or arrangements may be used when patterning device 36 includes a DMD.

Patterning device 38 is positioned to disperse light 42 of the second image split by device 34 into a predetermined pattern (not shown). The predetermined pattern facilitates providing a predetermined resolution of the second image, as viewed by imaging sensor 24. Although other patterns may be used, in some embodiments patterning device 38 disperses light of the first image into a diffraction pattern and/or an interference pattern. Although other patterning devices 38 may be used, in some embodiments patterning device 38 includes a diffraction grating, a phase grating, an LCD device, a DMD device, a light value, a reference pattern, and/or an LCOS device.

For example, in some embodiments patterning device 38 is a diffraction grating that disperses light into a diffraction pattern. In some embodiments, the diffraction grating includes a pattern of periodic lines and spaces, such as, for example, a ronchi ruling. However, the diffraction grating need not include a pattern of lines and spaces, much less periodic lines and spaces. Rather, the diffraction grating may include any pattern on and/or embedded within the substrate. The pattern may be formed on the substrate using any suitable method and/or structure. For example, in some embodiments the pattern is formed from a plurality of strands of material, such as, but not limited to metal strands (e.g., chrome strands), attached to and/or embedded within the substrate. In other embodiments, the pattern is etched into the substrate, and the etched portions may be filled with a suitable material, such as, but not limited to, metal (e.g., chrome). Although the substrate may be fabricated from other materials, in some embodiments the substrate of grating 36 is fabricated from glass and/or quartz.

In other embodiments, and for example, patterning device 38 includes a pattern (not shown) that disperses light channeled therethrough into an interference pattern, such as, but not limited to, a phase grating.

Figure 3:
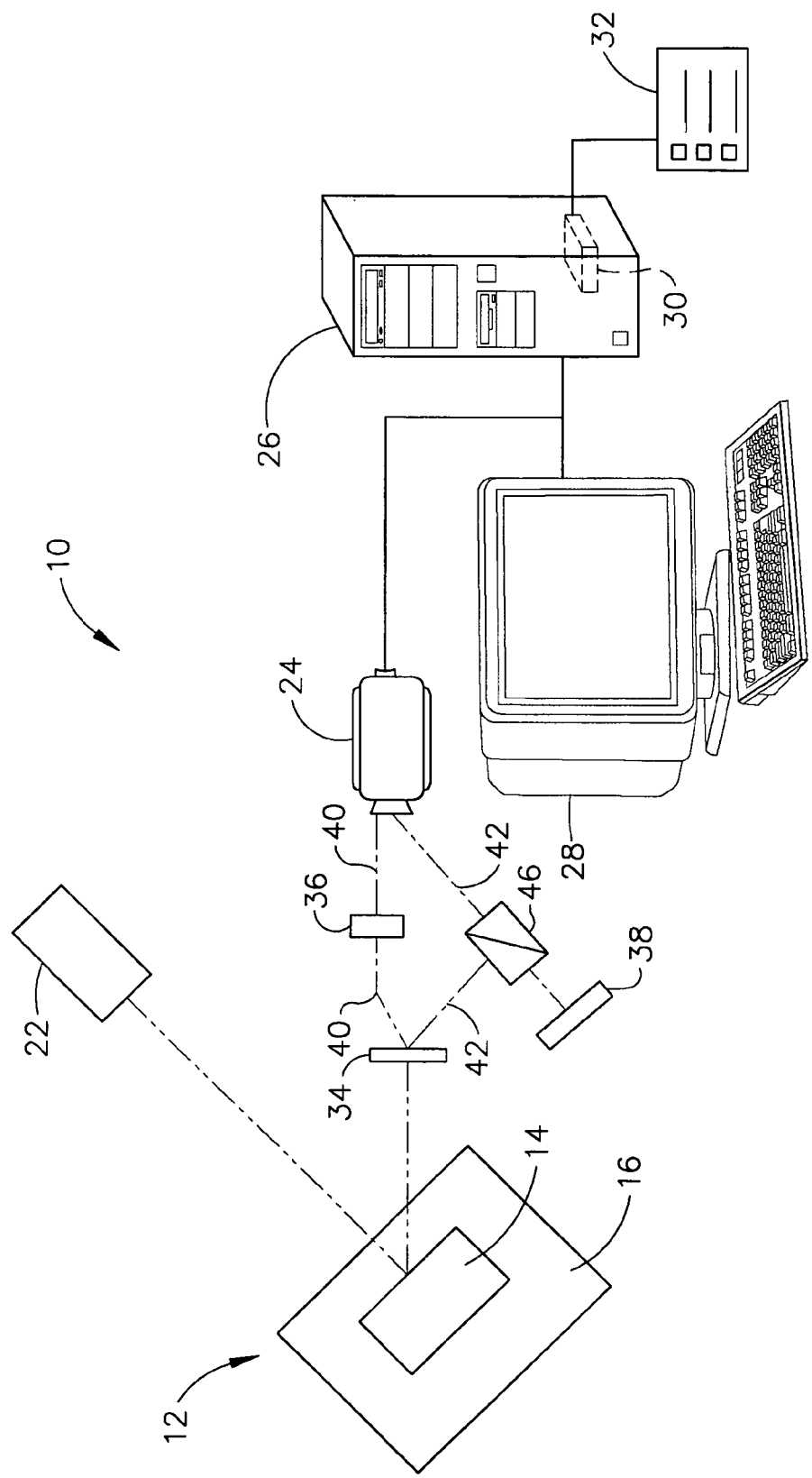
FIG. 3 is a block diagram of another embodiment of the structured light measurement system shown in FIG. 1.

FIG. 3 is a block diagram of an exemplary embodiment of system 10 wherein patterning device 38 includes a DMD. Light 42 of the second image split by light-splitting device 34 is reflected off a mirror 46 and directed to the DMD of patterning device 38. Although other mirrors 46 may be used, in some embodiments mirror 46 is a half-silver mirror. Light reflected off the DMD of patterning device 38 is dispersed by the DMD in the predetermined pattern and is channeled through mirror 46 for reception by imaging sensor 24. Of course, the embodiment of system 10 shown in FIG. 3 and described herein is exemplary only. Other configurations and/or arrangements may be used when patterning device 38 includes a DMD.

Figure 4:
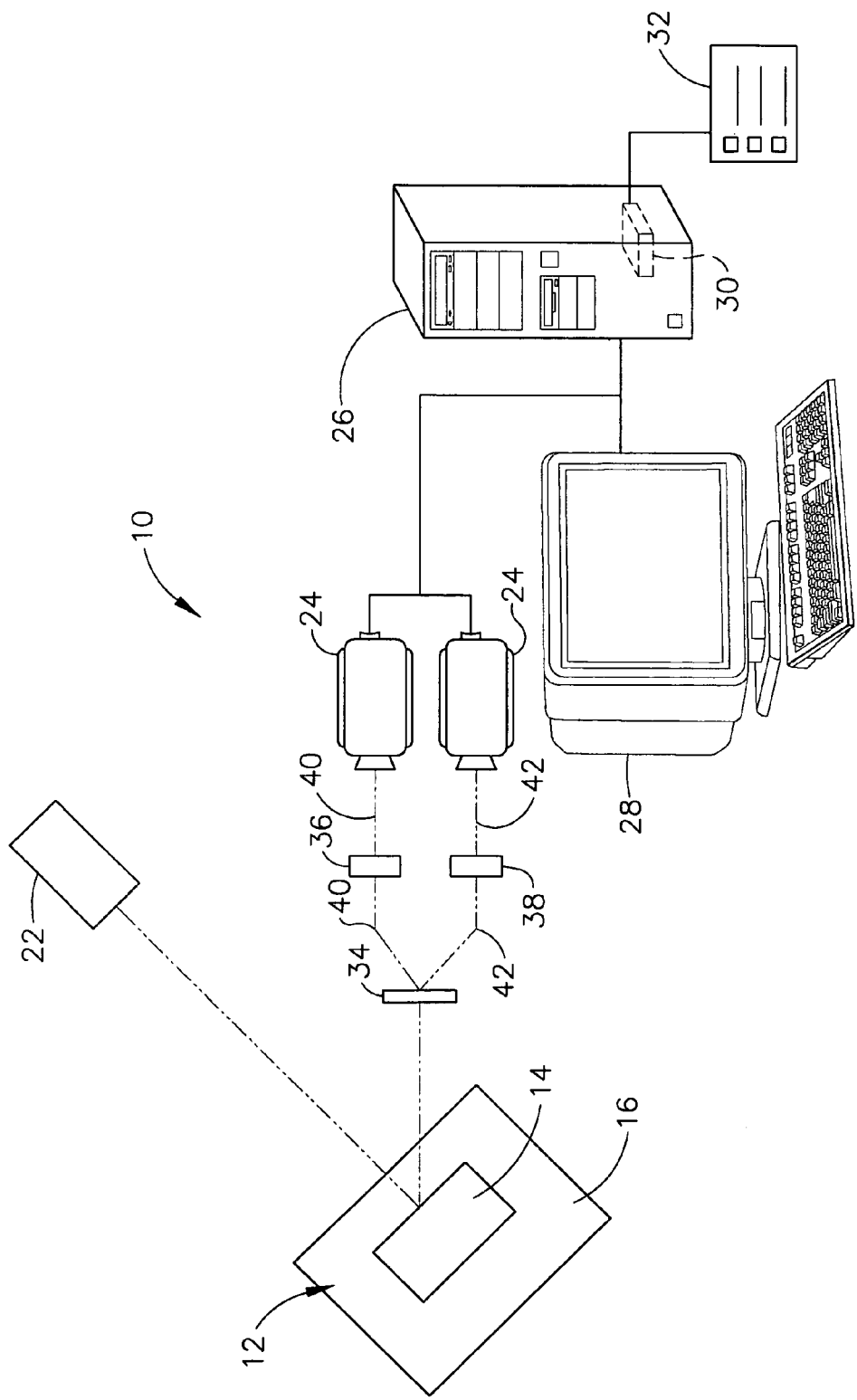
FIG. 4 is a block diagram of another embodiment of the structured light measurement system shown in FIG. 1.

The patterned light 40 dispersed from patterning device 36 and the patterned light 42 dispersed from patterning device 38 are each received by imaging sensor 24. More specifically, the first and second images formed by light 40 and 42, respectively, are received by imaging sensor 24. In the embodiment of FIGS. 1-3, the first and second images are both received by a single imaging sensor 24. Alternatively, the first and second images may each be received by a different imaging sensor 24. FIG. 4 is a block diagram of system 10 illustrating different imaging sensors 24 for receiving the first and second images. Once received by imaging sensor(s) 24, the first and second images can then be analyzed, for example using computer(s) 26, to, for example, determine features of object 12, such as, but not limited to, surface texture, surface orientation, and/or a material used in fabricating object 12. For example, although other methods may be used, in some embodiments computer(s) 26 use a phase-step analysis to determine features of object 12 from the first and second images. Moreover, and for example, in some embodiments to determine features of object 12, computers(s) 26 determine the center of lines projected onto object 12 and use the center positions to determine the distance to an object surface using known triangulation methods. Furthermore, and for example, in some embodiments to determine features of object 12, computer(s) 26 calculate the Fourier transform of a projected pattern and use local pattern frequency information to calculate a slope of an object surface as a means to follow a contour of object 12. In some embodiments, the first and second images are optically and/or electronically (for example using computer(s) 26) combined to form a common image for analysis thereof. By combining the first and second images into a common image for analysis, system 10 may simplify registration of other data (for example images of object 12 other than the first and second images) with the first and second images.

As described above, the predetermined pattern of the first image generated by patterning device 36 facilitates providing a predetermined resolution of the first image, as viewed by imaging sensor 24. More specifically, patterning device 36 changes a resolution of light 40 of the first image after being split by light-splitting device 34 and before being received by imaging sensor 24. Similarly, the predetermined pattern of the second image generated by patterning device 38 facilitates providing a predetermined resolution of the second image, as viewed by imaging sensor 24. More specifically, patterning device 38 changes a resolution of light 42 of the second image after being split by light-splitting device 34 and before being received by imaging sensor 24. The resolutions of the first and second images can each be selected to be, or approximate, a desired resolution for inspecting a particular area of object 12. Accordingly, images of different resolutions of object 12 can be taken simultaneously, thereby allowing system 10 to simultaneously inspect different areas of object 12 that have different desired inspection resolutions, possibly reducing an inspection time of object 12. Moreover, the first and second images, or a common combined image, can be combined with images taken from different angles of view than the first and second images to generate a coarser inspection of object 12. A technical effect of the systems and methods described herein includes simultaneously inspecting different areas of an object that have different desired inspection resolutions, possibly reducing an inspection time.

Although the systems and methods described and/or illustrated herein are described and/or illustrated with respect to gas turbine engine components, and more specifically an engine blade for a gas turbine engine, practice of the systems and methods described and/or illustrated herein is not limited to gas turbine engine blades, nor gas turbine engine components generally. Rather, the systems and methods described and/or illustrated herein are applicable to any object.

Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the assemblies and methods described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for inspecting an object, said method comprising:

emitting light from a light source;

projecting the light emitted from the light source directly onto a surface of the object;

splitting light reflected from the object surface into light of a first image and light of a second image;

using a single first patterning device to disperse the light of the first image into a first predetermined pattern;

using a single second patterning device to disperse the light of the second image into a second predetermined pattern, wherein the first patterning device is different than the second patterning device;

receiving the first predetermined pattern and the second predetermined pattern with at least one imaging sensor; and analyzing the first and second predetermined patterns received by the at least one imaging sensor to facilitate inspecting at least a portion of the object.

2. A method in accordance with claim 1 wherein emitting light from a light source comprises emitting light from at least one of a liquid crystal display (LCD) device, a liquid crystal on silicon (LCOS) device, a digital micrometer device (DMD), a laser, a white light lamp, and a light emitting diode (LED).

3. A method in accordance with claim 1 wherein splitting light reflected from the object surface comprises splitting light from the object surface into the light of the first image and the light of the second image using at least one of a prism, a lens, a holographic element, and a beam splitter.

4. A method in accordance with claim 1 further comprising dispersing at least one of the light of the first image and the light of the second image into one of an interference pattern and a diffraction pattern.

5. A method in accordance with claim 4 wherein dispersing light comprises dispersing light using at least one of a diffraction grating, a phase grating, an LCD device, a DMD device, and an LCOS device.

6. A method in accordance with claim 4 wherein dispersing at least one of the light of the first image and the light of the second image comprises changing a resolution of at least one of the light of the first image and the light of the second image as viewed by the at least one imaging sensor.

7. A method in accordance with claim 1 wherein receiving the first predetermined pattern and the second predetermined pattern with at least one imaging sensor comprises receiving the first and second predetermined patterns with a first imaging sensor, and wherein analyzing the first and second predetermined patterns comprises at least one of optically and electronically combining the first and second predetermined patterns.

8. A method in accordance with claim 1 wherein receiving the first predetermined pattern and the second predetermined pattern with at least one imaging sensor comprises receiving the first predetermined pattern with a first imaging sensor and receiving the second predetermined pattern with a second imaging sensor, and wherein analyzing the first and second predetermined patterns comprises at least one of optically and electronically combining the first and second predetermined patterns.

9. A method in accordance with claim 1 wherein analyzing the first and second predetermined patterns comprises identifying at least one of a surface texture, a surface orientation, and a material used in fabricating the object based on light received by the at least one imaging sensor.

10. A method in accordance with claim 1 wherein analyzing the first and second predetermined patterns comprises analyzing the first and second predetermined patterns using a phase-step analysis.

11. A structured light measurement system for inspecting an object, said structured light measurement system comprising:
　a structured light source configured to project structured light directly onto a surface of the object;
　an imaging sensor configured to receive structured tight reflected from the object surface;
　a light splitting device positioned to split light reflected from the object into light of a first image and light of a second image;
　a single first patterning device configured to disperse the light of the first image into a first predetermined pattern; and
　a single second patterning device configured to disperse the light of the second image into a second predetermined pattern, wherein the second patterning device is different from the first patterning device.

12. A system in accordance with claim 11 wherein said structured light source comprises at least one of a liquid crystal display (LCD) device, a liquid crystal on silicon (LCOS) device, a digital micromirror device (DMD), a laser, a white light lamp, and a light emitting diode (LED).

13. A system in accordance with claim 11 wherein said light splitting device comprises at least one of a prism, a lens, a holographic element, and a beam splitter.

14. A system in accordance with claim 11 wherein at least one of said first patterning device and said second patterning device comprises at least one of a diffraction grating, a phase grating, an LCD device, a DMD device, a light valve, a reference pattern, and an LCOS device.

15. A system in accordance with claim 11 further comprising a computer operatively connected to said imaging sensor and configured to combine the first and second predetermined patterns.

16. A method in accordance with claim 1 further comprising transmitting the light of the first image along a first path and transmitting the light of the second image along a second path that is different than the first path.

17. A system in accordance with claim 11 wherein said first predetermined pattern has a first resolution and said second predetermined pattern has a second resolution that is different than said first resolution.

* * * * *